(12) United States Patent
Randahl et al.

(10) Patent No.: US 6,625,175 B1
(45) Date of Patent: Sep. 23, 2003

(54) METHOD AND AN ARRANGEMENT FOR SECURING AN ADSL CONNECTION

(75) Inventors: Torbjörn Randahl, Nacka (SE); Stefan Barkarö, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/439,131

(22) Filed: Nov. 12, 1999

(30) Foreign Application Priority Data

Nov. 13, 1998 (SE) .............................................. 9803887

(51) Int. Cl.⁷ ................................................. H04J 1/02
(52) U.S. Cl. ................................... 370/493; 379/399.01
(58) Field of Search ........................... 379/399.01, 424, 379/425, 394, 382, 386, 400, 413.02, 93.09, 93.08, 413.01; 370/493, 527, 430, 241, 252, 358, 264

(56) References Cited

U.S. PATENT DOCUMENTS

| | | | | |
|---|---|---|---|---|
| 5,383,180 A | * | 1/1995 | Kartalopoukos | ............ 370/437 |
| 5,966,430 A | * | 10/1999 | Yoshida | ................. 379/100.15 |
| 6,097,505 A | * | 8/2000 | Miwa et al. | ................. 358/434 |
| 6,373,860 B1 | * | 4/2002 | O'Toole et al. | ............. 370/493 |

FOREIGN PATENT DOCUMENTS

WO  97/20396  6/1997

OTHER PUBLICATIONS

ITU–Telecommunication Standardization Sector Temporary Document RB–19–E, "Splitterless DMT System Design and Measurements", Aware, Inc., pp. 27–29 (Oct., 1997).

* cited by examiner

*Primary Examiner*—Rexford Barnie

(57) ABSTRACT

To secure an ADSL connection to an ADSL transceiver connected to a telephone line to be used also by an associated telephone, the telephone is normally kept disconnected from the telephone line and a predetermined number of bits is allocated to the ADSL connection. Upon an off-hook condition of the telephone in connection with an outgoing call, and upon a presence of a ringing signal on the telephone line or an off-hook condition of the telephone in connection with an incoming call, a predetermined lower number of bits is allocated to the ADSL connection before the telephone is connected to the telephone line.

4 Claims, 1 Drawing Sheet

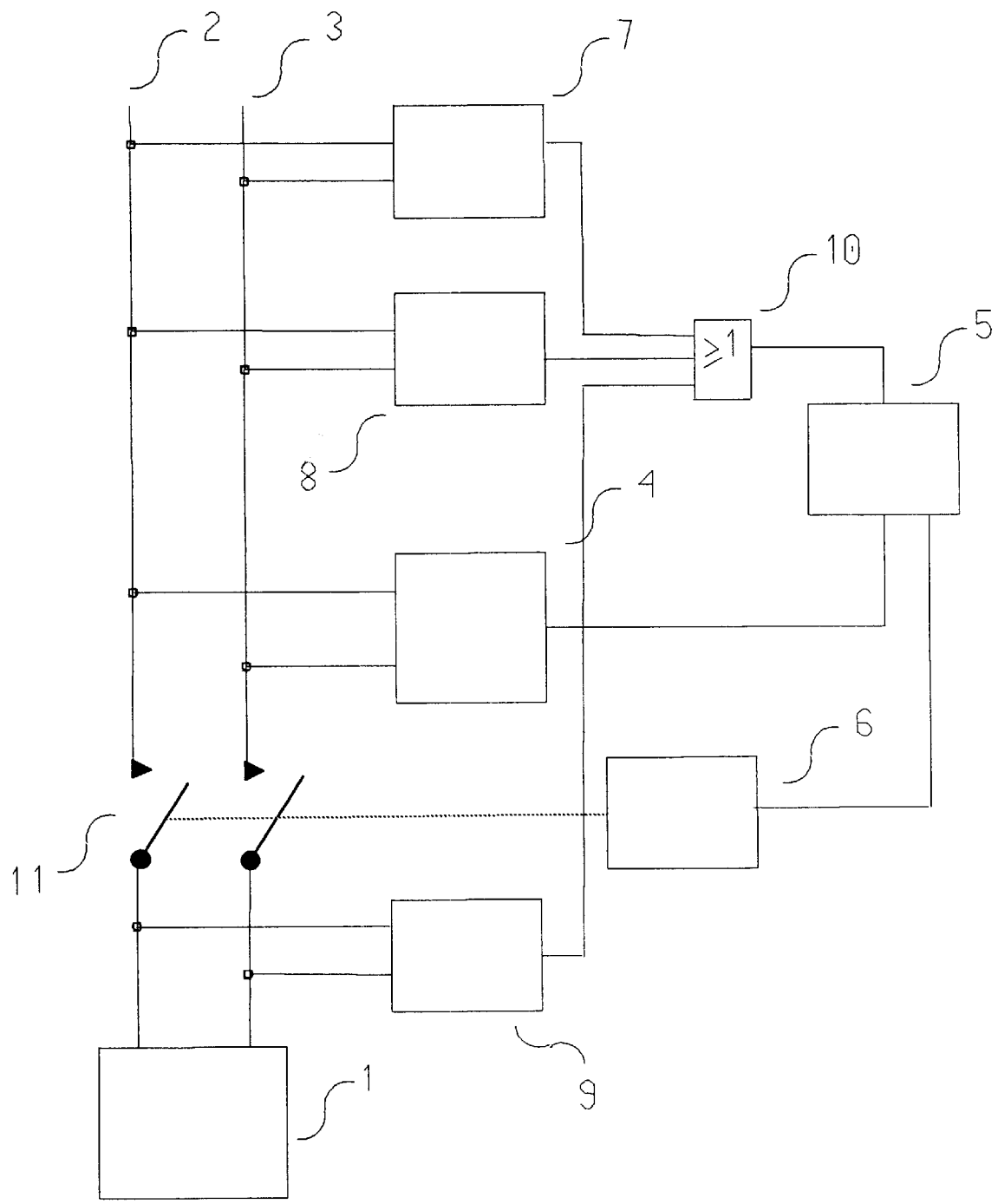

METHOD AND AN ARRANGEMENT FOR SECURING AN ADSL CONNECTION

TECHNICAL FIELD

The invention relates generally to Asymmetrical Digital Subscriber Line (ADSL) systems and more specifically to a method and an arrangement for securing an ADSL connection to an ADSL transceiver connected together with a telephone to a common telephone line.

BACKGROUND OF THE INVENTION

This invention is related to the invention described in Swedish patent application No. 9801646-2.

As described in the above patent application, in ADSL systems, data signals are transferred at the same time as telephony on a common telephone line.

The telephone traffic and the ADSL traffic have to be able to coexist on the telephone line, i.e. one should be able to talk in a telephone at the same time as one is connected with a computer without disturbing either traffic.

In traditional ADSL technology, this is solved by means of a so called splitter, which in principle is a high-order filter which is connected in series with the telephone and makes the telephone "invisible" for ADSL signals. By means of such a filter, disturbances from the telephone to an ADSL modem are avoided, e.g. when the telephone goes off-hook, i.e. when the impedance in the telephone is abruptly changed from a high to a low value. Without such filter, this would result in a changed attenuation of the ADSL signals and, consequently, in a changed signal-to-noise ratio. In its turn, this could cause the ADSL system to loose synchronization, since the modem is set up for signal-to-noise ratios that existed when the modem was initialized.

The major problem with such a splitter filter is that it is very expensive and bulky. Moreover, it takes a specialist to install such a filter, which makes it even more expensive.

To facilitate the exploitation of ADSL, a form of ADSL has been defined, for which it will be possible to run telephone traffic and ADSL traffic simultaneously without such splitters but with reduced performance. This application is popularly called ADSL-Lite or splitterless ADSL.

However, the risk of loosing the synchronization still remains.

Upon a call to the telephone, the telephone station first sends out a ringing signal having a frequency between 20 and 60 Hz depending on the market, and having a signal level which is specified to be at least 40 V r.m.s. at the telephone. Often, the level is considerably higher.

When the telephone goes off-hook, the impedance is abruptly changed to a considerably lower level.

In the case of ADSL, it is of particular interest which impedance the telephone has in the ADSL band.

For ADSL-Lite, a downstream band, i.e. traffic from the station to the subscriber, of around 550 kHz is considered, while an upstream band, i.e. traffic from the subscriber to the station, of 138 kHz is considered.

Measurements of some typical telephones give the following impedance values:

On-hook impedance @ 100 kHz=3 kΩ
On-hook impedance @ 400 kHz=800Ω
Off-hook impedance @ 100 kHz=60Ω
Off-hook impedance @ 400 kHz=8Ω

The driving and terminating impedance of the ADSL modem is normally adapted to the characteristic impedance of the telephone line within the ADSL band, which is around 100Ω. Considering the load that the modem on the subscriber side sees looking out onto the line, it will be very different in the above cases.

Suppose that the characteristic impedance of the line is equal to 100Ω and that the line is correctly terminated on the station side with 100Ω in the ADSL band.

The load seen looking out form the modem is of importance only for the upstream band, i.e. up to 138 kHz:

Load On-hook @ 100 kHz=97Ω
Load-Off hook @ 100 kHz=37Ω

In the same manner as the load changes, the terminating impedance for downstream traffic will change:

Terminating Impedance On-hook @ 400 kHz 89Ω
Terminating Impedance Off-hook @ 400 kHz=7.5Ω

In principle, this means that both the incoming and outgoing signals will be considerably more attenuated for the off-hook case than with the telephone in on-hook condition. This implies a great risk for the ADSL system to loose the synchronization, since bit allocation is carried out in correspondence to the conditions at hand during the training sequence which is normally run with the telephone in on-hook condition.

ADSL utilizes discrete multitone (DMT) coding according to which the available bandwidth is divided into 4.3 kHz channels. During the training sequence, the signal-to-noise ratio in all channels is measured and, thereafter, it is decided how many data bits can be allocated to a certain carrier channel.

For ADSL-Lite, 256 QAM (Quadrature Amplitude Modulation) is used, which means that a maximum of 8 bits can be allocated to each carrier channel. When the telephone goes off-hook, the signal levels will be lowered due to further attenuation which means that the signal-to-noise ratio will be degraded.

The upstream traffic will have a three times lower signal level or a signal-to-noise ratio degradation of 9.5 dB, while the degradation downstreams can be as much as twelve times or 21.5 dB. Due to this considerable impedance change in the ADSL band in off-hook condition of the telephone in an ADSL-Lite application, the signal-to-noise ratio is degraded so much that the system will loose the synchronization and have to be restarted by means of a new training sequence.

SUMMARY

The object of the invention is to secure an ADSL connection in connection with the making of an outgoing call from the associated telephone as well as in connection with an incoming call to the associated telephone.

This is attained in accordance with the invention by detecting an off-hook condition of the telephone in connection with the making of an outgoing call, and the presence of a ringing signal in connection with an incoming call, and in response to these conditions, allocating a lower number of bits to the ADSL connection. Hereby, the risk of loosing synchronization will be more or less eliminated.

BRIEF DESCRIPTION OF THE DRAWING

The invention will be described more in detail below with reference to the appended drawing on which the single FIGURE shows one embodiment of an arrangement according to the invention for securing an ADSL connection.

DETAILED

In the FIG. 1 represents a conventional telephone which, in accordance with the invention, normally is disconnected from wires 2, 3 of a two-wire telephone line from a telephone station (not shown), in the embodiment shown, by means of normally open contacts 11 of a relay 6. Preferably, the relay contacts 11 are located close to the telephone 1. In this connection, it should be pointed out that it is not necessary to use just a relay but that any kind of switch, e.g. a semiconductor switch, can be used.

In the embodiment shown, the relay 6 is supposed to be a so called drop-back relay, i.e. a relay which will close its contacts in case the supply current to the relay ceases.

In accordance with the invention, the telephone 1 is connected to the wires 2, 3 of the telephone line by closure of the relay contacts 11 when an outgoing call is made from the telephone 1 and when a call is coming in to the telephone 1 form the telephone station.

To detect when an outgoing call is made from the telephone 1, i.e. when the telephone 1 goes off-hook in connection with the making of an outgoing call, in accordance with the invention, a local DC current supply/hook detector unit 9 is connected with its input terminals to the wires 2, 3 of the telephone line at a point between the telephone 1 and the relay contacts 11. The current supply/hook detector unit 9, on the one hand, supplies the telephone 1 with a low current as long as the relay contacts 11 are open, i.e. as long as the telephone 1 is disconnected from the wires 2 and 3 of the telephone line, and, on the other hand, detects when that current is interrupted. The output terminal of the current supply/hook detector unit 9 is connected to a first input terminal of an OR circuit 10. A "1" appears on the output terminal of the current supply/hook detector unit 9 when the telephone 1 goes off-hook in connection with an outgoing call when the relay contacts 11 are open.

To detect an incoming call to the telephone 1, a ringing signal detector 7 is connected with its input terminals to the wires 2 and 3 of the telephone line at a point between the relay contacts 11 and the telephone station to detect whether or not a ringing signal is present on the line. The output terminal of the ringing signal detector 7 is connected to a second input terminal of the OR circuit 10. A "1" appears on the output terminal of the ringing signal detector 7 when a ringing signal is present on the telephone line.

To detect when the telephone 1 goes off-hook in connection with an incoming call, a hook detector 8 is connected with its input terminals to the wires 2 and 3 of the telephone line also at a point between the relay contacts 11 and the telephone station. The output terminal of the hook detector 8 is connected to a third input terminal of the OR circuit 10. A "1" appears on the output terminal of the hook detector 8 when the telephone 1 goes off-hook in connection with an incoming call.

To establish an ADSL connection, an ADSL transceiver 4 is connected to the wires 2, 3 at a point between the relay contacts 11 and the telephone station.

In a manner known per se, different numbers of bits are allocated to the ADSL connection when the telephone 1 is on-hook and no ringing signal is present, and when the telephone 1 is off-hook or a ringing signal is detected.

These numbers of bits have been decided in advance by measuring the signal-to-noise ratio of the ADSL connection in on-hook as well as in off-hook condition of the telephone 1.

In correspondence to the measured signal-to-noise ratios, a first, higher number of bits to be allocated to the ADSL connection when the telephone 1 is on-hook and no ringing signal is present, is set in a register 5, and a second, lower number of bits to be allocated to the ADSL connection when the telephone is off-hook or a ringing signal is detected, is also set in the register 5.

The different numbers of bits set in the register 5, are allocated to the ADSL connection via an output terminal of the register 5, connected to an input terminal of the ADSL transceiver 4. The allocation takes place under control of the OR circuit 10 whose output terminal is connected to a control input terminal of the register 5.

A relay control output terminal of the register 5 is connected to a control input terminal of the relay 6.

As mentioned above, the first, higher number of bits set in the register 5, is allocated to the ADSL connection as long as the telephone 1 is on-hook and no ringing signal is detected.

The allocation of the second, lower number of bits to the ADSL connection will be described below in connection with both an outgoing and an incoming call.

Outgoing Call

When the telephone 1 goes off-hook to make an outgoing call, the local DC current supply/hook detector unit 9 detects that by detecting that the locally supplied current to the telephone 1, increases. In response hereto, the local current supply/hook detector unit 9 outputs a "1" on its output terminal which is connected to an input terminal of the OR circuit 10.

This causes the OR circuit 10 to output a "1" to the control input terminal of the register 5.

Upon receipt of the "1" from the OR circuit 10, the register 5 allocates the second, lower number of bits to the ADSL transceiver 4, and controls the relay 6 to close its contacts 11 to connect the telephone 1 to the wires 2, 3 of the telephone line to the telephone station.

The closing of the relay contacts 11 is preferably done with a certain delay in order to ensure that the lower number of bits has been properly allocated to the ADSL connection before the relay contacts 11 are closed.

Hereby, the telephone 1 is ready to make an outgoing call, and the ADSL transceiver 4 operates with the lower number of bits.

That the telephone 1 is off-hook is now detected by the hook detector 8. In response hereto, the hook detector 8 outputs a "1" on its output terminal which is connected to an input terminal of the OR circuit 10. This causes the OR circuit 10 to output a "1" to the control input terminal of the register 5 to maintain the allocation of the second, lower number of bits to the ADSL transceiver 4.

During the time between closure of the relay contacts 11 and the detection by the hook detector 8 of the off-hook condition of the telephone 1, the output signal of the OR circuit 10 to the register 5, is disregarded.

When the telephone 1 goes on-hook again upon termination of the outgoing call, this is detected by the hook detector 8. In response hereto, a "0" is outputted by the hook detector 8 to the OR circuit 10, and the "1" on its output terminal connected to the input terminal of the register 5, ceases to exist.

When no "1" appears on the input terminal of the register 5, the register 5 again allocates the higher number of bits to the ADSL transceiver 4, and controls the relay 6 to open its contacts 11 after a certain delay to ensure that the higher number of bits has been allocated to the ADSL connection before the relay contacts 11 are opened.

When the relay contacts 11 are opened, the local current supply/hook detector unit 9 will again supply current to the telephone 1.

Incoming Call

An incoming call, i.e. a ringing signal on the telephone line from the telephone station, is detected by the ringing signal detector 7. A "1" will thus appear on its output terminal connected to an input terminal of the OR circuit 10.

The "1" which will appear on the output terminal of the OR circuit 10, will cause the register 5 to allocate the lower number of bits to the ADSL transceiver 4, and to control the relay 6 to close its contact 11 after a certain delay to ensure that the ADSL transceiver 4 operates with the lower number of bits before the relay contacts 11 are closed.

When the relay contacts 11 are closed, the ringing signals on the telephone line will reach the telephone 1 and cause it to ring.

Incoming Call Not Answered

If the incoming call is not answered at the telephone 1, the ringing signals will eventually cease.

This will be detected by the detector 7. The "1" on its output terminal connected to the OR circuit 10 will disappear, causing the register 5 to again allocate the higher number of bits to the ADSL transceiver 4, and to control the relay 6 to again open its contacts 11 after a certain delay to ensure that the bit allocation has been completed before the relay contacts 11 are opened.

When the relay contacts 11 are opened, the local current supply/hook detector unit 9 will again supply current to the telephone 1.

Incoming Call Answered

If the incoming call is answered at the telephone 1 in that the telephone 1 goes off-hook, the ringing signals will also cease, causing the "1" to disappear from the output terminal of the ringing signal detector 7, connected to an input terminal of the OR circuit 10.

However, the hook detector 8 will detect that the telephone 1 goes off-hook. A "1" will, thus, appear on the output terminal of the hook detector 8, connected to an input terminal of the OR circuit 10. This "1" will, in its turn, appear on the output terminal of the OR circuit 10, connected to the control input terminal of the register 5.

The "1" appearing on the control input terminal of the register 5, will, thus, cause the register 5 to maintain its allocation of the lower number of bits to the ADSL connection, and to maintain the relay 6 in the state with its contacts 11 closed.

When the call is finished, i.e. when the telephone 1 goes on-hook again, this will be detected by the hook detector 8.

The "1" on the output terminal of the hook detector 8 will disappear and so will the "1" on the output terminal of the OR circuit 10, connected to the control input terminal of the register 5.

In response hereto, the relay 6 will be caused to open its contacts 11.

When the relay contacts 11 are opened, the local current supply/hook detector unit 9 will again supply current to the telephone 1.

After a certain delay, the register 5 will allocate the higher number of bits to the ADSL transceiver 4.

The telephone 1 is now ready for another outgoing or incoming call.

By allocating different numbers of bits to the ADSL connection as described above, the risk of loosing synchronization will be more or less eliminated.

What is claimed is:

1. A method of securing an Asymmetrical Digital Subscriber Line (ADSL) connection to an ADSL transceiver connected to a telephone line to be used also by an associated telephone, the method comprising:

normally, keeping the telephone disconnected from the telephone line and allocating a predetermined number of bits to the ADSL connection, detecting, in connection with an outgoing call, an off-hook condition of the telephone and, in connection with an incoming call, a presence of a ringing signal on the telephone line or an off-hook condition of the telephone, and causing, in response thereto, a predetermined lower number of bits to be allocated to the ADSL connection before the telephone is connected to the telephone line.

2. An arrangement for securing an Asymmetrical Digital Subscriber Line (ADSL) connection to an ADSL transceiver connected to a telephone line to be used also by an associated telephone, wherein normally, the telephone is disconnected from the telephone line and a predetermined number of bits is allocated to the ADSL connection, the arrangement comprising means for detecting an off-hook condition of the telephone in connection with an outgoing call, means for detecting a presence of a ringing signal on the telephone line, means for detecting an off-hook condition of the telephone in connection with an incoming call, and means for causing in response to the detection of the ringing signal or off-hook condition, a predetermined lower number of bits to be allocated to the ADSL connection before the telephone is connected to the telephone line.

3. The arrangement as claimed in claim 2, wherein the telephone is disconnected from the telephone line via a normally open switch, and a local DC current supply/hook detector is adapted to be connected to the telephone line between said normally open switch and the telephone to supply DC current to the telephone when the switch is open, and to detect when the telephone goes off-hook with said switch open in connection with an outgoing call, and in response thereto cause the switch to connect the telephone to the telephone line.

4. The arrangement as claimed in claim 3, wherein the detecting means are connected to the telephone line to detect a presence of a ringing signal on the telephone line or an off-hook condition of the telephone in connection with an incoming call to the telephone, and to cause, in response thereto, the switch to connect the telephone to the telephone line.

* * * * *